United States Patent [19]
Andersson

[11] Patent Number: 4,544,222
[45] Date of Patent: Oct. 1, 1985

[54] ELECTRICAL CONTACT

[76] Inventor: Ove Andersson, Oxhagsgatan 106, S-561 50 Huskvarna, Sweden

[21] Appl. No.: 505,239

[22] Filed: Jun. 17, 1983

[30] Foreign Application Priority Data

Jun. 24, 1982 [SE] Sweden .............................. 8203951

[51] Int. Cl.⁴ ........................................... H01R 13/62
[52] U.S. Cl. .................................. 339/75 M; 339/10; 339/44 M
[58] Field of Search ................... 339/75 R, 75 M, 10, 339/39, 44 R, 44 M, 49 R, 49 B, 255 R

[56] References Cited

U.S. PATENT DOCUMENTS

| 894,644 | 7/1908 | Hill | 339/39 |
|---|---|---|---|
| 2,369,860 | 2/1945 | Schroeder | 339/75 R |
| 2,535,031 | 12/1950 | Beatty | 339/39 |
| 2,945,201 | 7/1960 | Waninger | 339/49 R |
| 3,016,509 | 1/1962 | Waninger | 339/49 B |
| 3,668,605 | 6/1972 | Albert | 339/75 M |

FOREIGN PATENT DOCUMENTS 3031261 4/1982 Fed. Rep. of Germany .
112786 12/1944 Sweden .
130815 2/1951 Sweden .
184591 7/1963 Sweden .

Primary Examiner—John McQuade
Attorney, Agent, or Firm—Ostrolenk, Faber, Gerb & Soffen

[57] ABSTRACT

An electrical contact for connecting a trailer to the electrical system of a towing vehicle is disclosed. The contact includes two contact parts designed to be detachably connected together. One contact part is preferably adapted for fixed mounting and the other for mounting on a cable. One of the contact parts is provided with flat, protruding pins as contact elements and the other contact part is provided with spring-loaded, depressed, flat pins, the ends of which do not protrude beyond the outer limiting wall of the contact part. The pins of the two contact parts are arranged to be pushed toward each other to produce electrical contact between opposing surfaces. The cable-mounted contact part is provided with an upper, protruding front section, designed to be inserted behind a shoulder on the upper rear section of the preferably fixed contact, in order to connect the contact parts by means of a downward lever movement.

11 Claims, 3 Drawing Figures

ELECTRICAL CONTACT

BACKGROUND OF THE INVENTION

1. Field of the Invention

The invention relates to an electrical contact, preferably for connecting a trailer to the electrical system of the towing vehicle, comprising two contact parts, one contact part being preferably for permanent assembly and the other for assembly on a cable, designed to be detachably connected together.

2. Description of the Prior Art

The electrical contacts available hitherto consist of a female contact part arranged on the towing vehicle and a male contact part arranged on a cable on the trailer. The contact elements consist of circular pins distributed within a specific area. A cover is generally arranged on the contact of the towing vehicle to protect it from dirt and moisture. A locking means is also provided to lock the two contact parts together.

These conventional electrical trailer contacts have certain drawbacks. They have straight, circular pins distributed within an area on the trailer contact. These pins are plugged straight into the fixed contact, thus necessitating a locking means to prevent the contact means from separating during use. If, therefore, the trailer is disconnected without the contact means first having been removed, the cable will be ripped off.

Furthermore, the pins on the trailer contact are always subjected to moisture and dirt, as well as mechanical damage. This means that the contact very soon becomes loose due to wear in the towing-vehicle contact, although it is itself protected by a cover.

Another drawback is the fact the pins are generally distributed within a circular area. The risk of incorrect connection is considerable since the cables are not arranged in a logical sequence. Furthermore, the number of connections available is limited due to lack of space. At present the number of connections available in contacts of this type is seven.

SUMMARY OF THE INVENTION

The object of the present invention is thus to provide an electrical contact having greater electrical reliability permitting a greater number of connections and a logical sequence of connections and which does not require the contact parts to be locked together by a locking means during normal use.

This and other objects are achieved according to the present invention in which one of the contact parts is provided with flat, protruding pins as contact elements. The other contact part is provided with spring-loaded, depressed, flat pins, the ends of which do not protrude beyond the outer limiting surface of the contact part. The pins are arranged to be pushed towards each other to produce electrical contact between opposing surfaces. The cable-mounted contact part is provided with an upper, protruding front section, designed to be inserted behind a shoulder on the upper rear section of the preferably fixed contact, in order to connect the contact parts by means of a downward lever movement.

In the following the invention will be described by way of illustration as applied to an electrical contact for connecting a trailer to the electrical system of a towing vehicle. However, this should not be considered as any limitation of the invention which can of course be applied in many other situations, such as for connections on building sites or other "tough" environments, as will be understood by the man skilled in the art.

According to a preferred embodiment of the invention the mutual incline of the contact parts is such that the cable end of the cable-mounted contact part is directed downwardly at an angle in relation to the horizontal plane of the preferably fixed contact part.

BRIEF DESCRIPTION OF THE DRAWINGS

Additional advantages and features of the present invention will be revealed in the following detailed description with reference to the accompanying drawings, in which.

DETAILED DESCRIPTION OF THE PREFERRED EMBODIMENT

Figure 1:
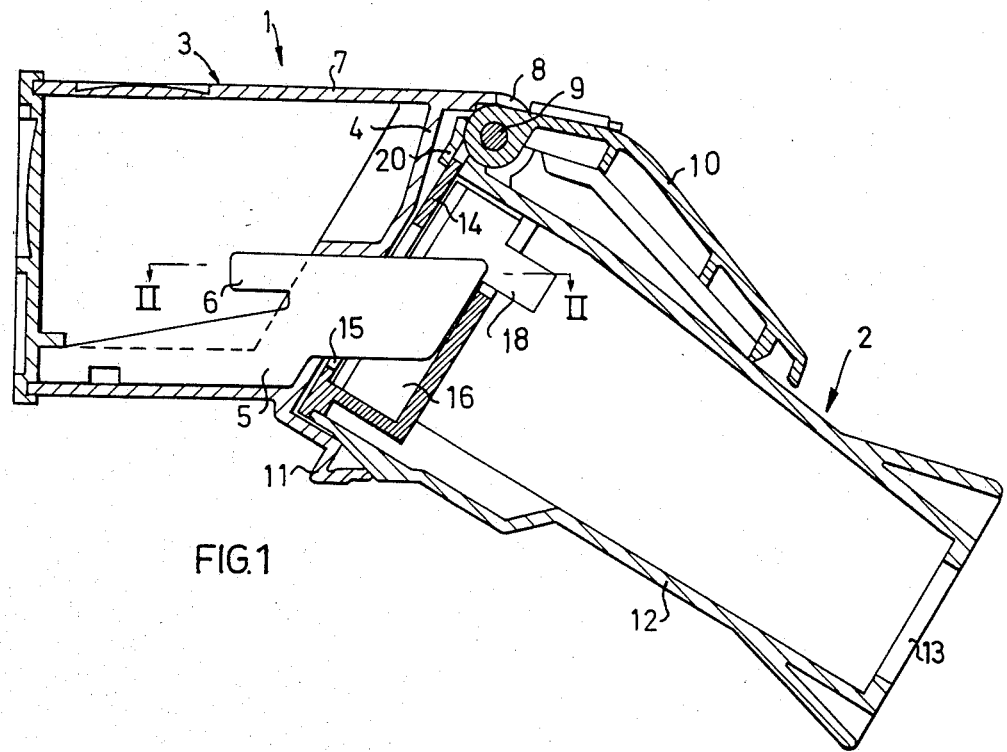
FIG. 1 shows a longitudinal cross-section seen from the side, of the electrical contact of the invention.

FIG. 1 shows the electrical contact of the invention, consisting of two contact parts 1, 2. Contact part 1 is preferably designed to be permanently mounted and is termed "the fixed contact" in the following in order to facilitate appreciation of the invention. The second contact part 2 is termed "the free contact part" in the following. Both contact parts can of course be free in certain applications. The fixed contact part 1 consists of a cover 3 with a rear defining wall 4 for flat contact pins 5 to pass therethrough. These connections may be designed in any suitable manner. The defining wall 4 is preferably inclined in relation to the horizontal plane of the contact part for reasons which will become clear in the following.

A shoulder 8 is arranged in the extension of the upper wall 7 of the cover 3. In the embodiment shown, a shaft 9 runs through said shoulder and a protective lid 10 pivots on said shaft 9. A hook 11 is arranged at the rear edge of the cover 3, for a locking means if used.

Figure 2:
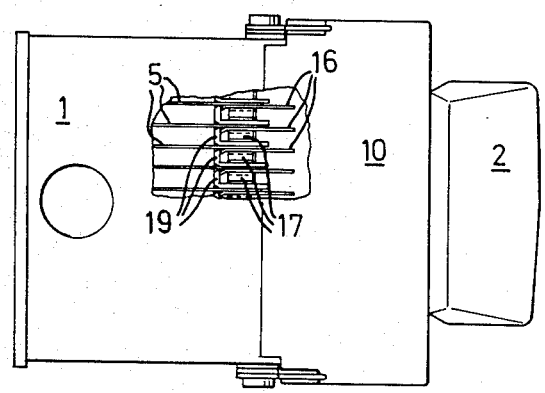
FIG. 2 shows a top view of the invention, partly in cross-section, taken along the line II—II in FIG. 1.

The free contact part 2 consists of a cover 12 with cable opening 13 and a front defining wall 14. One or more openings 15 are arranged at the front defining wall 14. Behind said opening or openings 15 flat contact pins 16 are arranged. Each of these pins is spring-loaded by a member 17, as shown in FIG. 2. The contact pins 16 are also provided with connections 18 for electric cables.

As shown in FIG. 2 the pins 5 and 16 are preferably arranged standing side by side. The protruding pins 5 in the contact part 1 abut with one surface against the contact pins 16 in the contact part 2. Each spring member 17, which may consist of a leaf-spring, a rubber pad or other suitable resilient material, presses adjacent contact pin 16 against the abutting contact pin 5 with a certain predetermined force, built into the device. The other surface of the contact pin 5 abuts a holder 19 of material which is not electrically conducting, for the spring member 17. The other surface of the contact pin 16 is in contact with the spring member, which does not form a part of the electrical circuit.

Figure 3:
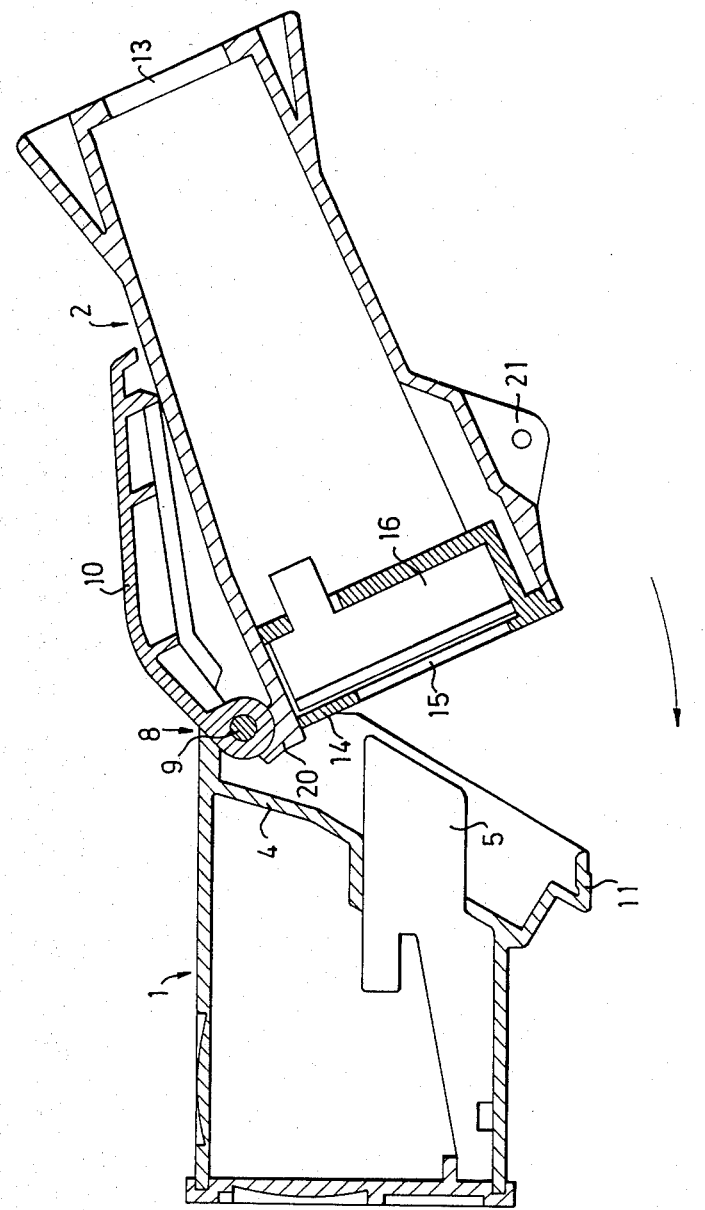
FIG. 3 shows a longitudinal cross-section seen from the side, illustrating the connection of the two contact parts.

At its upper, front edge the contact part 2 is provided with a protruding part 20. To illustrate connection and disconnection of the contact means according to the invention, reference is now made to FIG. 3.

The protruding part 20 of the contact part 2 is placed below the shoulder 8 on the cover of the contact part 1, after which a downwardly directed force is applied on the contact part 2. A considerable pressure is thus achieved when the two parts of the contact means are brought together and the contact pressure produced by the spring member 17 can thus be extremely high in comparison with the pressure previously possible in contact means of the type under consideration. Inclining the rear defining wall 4 of the fixed contact part 1 enables the free contact part 2 to be downwardly inclined in connected position in relation to the horizontal plane of the fixed contact, so that the weight of the cable as well as the contact pressure between the connection pins contributes to keeping the contact parts together. This eliminates the need for a locking means, thus also avoiding the risk of the cable being torn off if the contact means is by mistake not released when the trailer is disconnected from the towing vehicle.

In the embodiment shown in the drawings the contact part 2 is provided with an ear 21. A locking means may be arranged on this to lock the contact part 2 to the hook 11 on the fixed contact part 1. This may be advisable in special applications, such as forestry vehicles where there is a risk that twigs and branches might pull the contact means apart. It may also be of value in military vehicles to be able to select a locking means as accessory.

In the embodiment shown the protruding pins are arranged on the current-carrying contact part, i.e. that intended to be permanently mounted on the towing vehicle. This can be done without risk when only low current is involved, as in the case of cars. However, in the case of high current, e.g. on building sites, the protruding pins are preferably arranged on the loose, non-conducting contact part.

The reason it is preferred to place the protruding pins 5 on the fixed part is that they are then protected by the preferably spring-loaded lid 10 and normally, therefore, no unauthorized person can come into contact with the conducting pins 5. The pins are also protected against dirt. This also applies to the pins 16 in the free part. As described above, these are pressed against the holders of the spring members 17. Since the pressure is relatively high, both dirt and moisture are prevented from penetrating into the contact part. The high contact pressure also provides a certain cleaning effect when the two contact parts are joined. This cleaning effect can be further improved by making one or both surfaces slightly uneven or rough. Another advantage achieved by the arrangement according to the invention is that, since the spring member 17 constitutes a separate unit, the two pins can be made of the same or similar material, thus avoiding oxide deposits.

The drawings also show the pins standing side by side. Obviously, double rows of pins can be used, but the pins may also be placed horizontally in at least one row or several rows one on top of the other. In this case, however, great care must be taken to ensure that the protruding pins are not deformed.

The pins can be replaced one by one in the electrical contacts according to the invention, contrary to the known electrical contacts where the contact pins are cast in the contact parts. The protruding pins are inserted into the contact part while the depressed pins are arranged in compartments and are held in place by the spring means.

Another advantage of using the electrical contacts according to the invention is that it can easily be fitted together in the dark. As soon as the free contact part has been fitted in the fixed contact part, only the simple downward lever movement needs to be performed to join the contact parts. This is of particular interest for military vehicles.

I claim:

1. An electrical contact comprising;
   first and second contact parts for detachably connecting to each other,
   the first contact part comprising:
   a first cover having a first side for facing the second contact part;
   a shoulder on the first cover; and
   first contact means mounted to the first cover and disposed on the first side thereof;
   the second contact part comprising:
   a second cover having a second side for facing the first side of the first contact part;
   second contact means mounted to the second cover and disposed toward the second side thereof for contacting the first contact means; and
   a section on the second cover for fitting against the shoulder of the first contact part, the second contact part defining a lever around the section for moving the second contact part relative to the first contact part from a disconnected position in which the second side is away from the first side of the first contact part to a connection position in which the second side faces the first side, thereby bringing the first and second contact means into electrical contact;
   the first and second contact means each comprising a plurality of pins, each pin of the first contact means being arranged for making electrical contact with a corresponding pin of the second contact means when the second contact part is moved to the connected position;
   the second contact part further comprising spring means for pushing each pin of the second contact means against the corresponding pin of the first contact means;
   the spring means comprising a plurality of leaf-springs, each mounted to the second contact part adjacent a corresponding pin of the second contact means.

2. The electrical contact of claim 1 in which the first cover comprises a first defining wall having a first outer side at the first side of the first cover and the second cover comprises a second defining wall having a second outer side disposed at the second side of the second cover, a second inner side opposite the second outer side and at least one opening therebetween, the pins of the first contact means protruding from the first outer side of the first defining wall, the pins of the second contact means being disposed on the second inner side of the second defining wall, the pins of the first contact means protruding through the opening in the second defining wall for connecting to the pins of the second contact means when the first and second contact means are brought into electrical contact.

3. The electrical contact of claim 2 in which the first contact part in adapted for fixed mounting.

4. The electrical contact of claim 3 in which the first cover has an upper wall for extending generally horizontally when the first contact part is fixedly mounted, the shoulder being mounted to the upper wall, the first defining wall being inclined from the area of the shoulder to an area below the upper wall of the first cover, whereby the first defining wall is inclined for holding the second contact part in a downwardly inclined position hanging at an angle from the section on the second cover when the second contact part is in the connected position.

5. The electrical system of claim 2 in which the first contact part is adapted for mounting on the end of the cable.

6. An electrical contact comprising;

first and second contact parts for detachably connecting to each other, the first contact part comprising:

a first cover having a first side for facing the second contact part;

a shoulder on the first cover; and first contact means mounted to the first cover and disposed on the first side thereof;

the second contact part comprising:

a second cover having a second side for facing the first side of the first contact part;

second contact means mounted to the second cover and disposed toward the second side thereof for contacting the first contact means; and a section on the second cover for fitting against the shoulder of the first contact part, the second contact part defining a lever around the section for moving the second contact part relative to the first contact part from a disconnected position in which the second side is away from the first side of the first contact part to a connected position in which the second side faces the first side, thereby bringing the first and second contact means into electrical contact;

the first and second contact means each comprising a plurality of pins, each pin of the first contact means being arranged for making electrical contact with a corresponding pin of the second contact means when the second contact part is moved to the connected position;

the second contact part further comprising spring means for pushing each pin of the second contact means against the corresponding pin of the first contact means;

the spring means comprising a pad of an elastically yielding material between each pin of the second contact means and a respective supporting member of the second contact part.

7. The electrical contact of claim 1 or claim 6 in which the plurality of pins of each of the first and second contact means comprises at least twelve pins.

8. The electrical contact of claim 1 or claim 6 in which the pins of the first contact means and the pins of the second contact means are made of similar material for avoiding oxide deposits.

9. The electrical contact of claim 1 or claim 6 in which the pins of each of the first and second contact means are flat and are arranged side by side in at least one row.

10. The electrical contact of claim 1 or claim 6 in which the spring means is electrically insulated from the pins.

11. The electrical contact of claim 1 or claim 6 in which the spring means exerts a sufficient force against each pin of the second contact means for retaining the corresponding pin of the first contact means in a coupled position.

* * * * *